(12) United States Patent
Park

(10) Patent No.: US 8,411,342 B2
(45) Date of Patent: Apr. 2, 2013

(54) LIGHT SCANNING UNIT AND IMAGE FORMING APPARATUS

(75) Inventor: Gi-Sung Park, Anyang-Si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 847 days.

(21) Appl. No.: 12/508,146

(22) Filed: Jul. 23, 2009

(65) Prior Publication Data

US 2010/0067082 A1    Mar. 18, 2010

(30) Foreign Application Priority Data

Sep. 16, 2008 (KR) .................. 10-2008-0090687

(51) Int. Cl.
*G02B 26/08* (2006.01)
(52) U.S. Cl. .................. 359/205.1; 359/206.1; 359/662; 347/244
(58) Field of Classification Search .... 359/205.1–207.3, 359/207.6, 662; 347/244, 258
See application file for complete search history.

(56) References Cited

U.S. PATENT DOCUMENTS

| 6,489,982 B2* | 12/2002 | Ishibe ........................... 347/134 |
| 6,512,623 B1* | 1/2003 | Ishihara ..................... 359/207.1 |
| 8,115,793 B2* | 2/2012 | Tanimura et al. ............. 347/241 |
| 8,217,980 B2* | 7/2012 | Tanimura ..................... 347/244 |
| 2001/0015747 A1* | 8/2001 | Ishibe ........................... 347/129 |
| 2002/0001119 A1* | 1/2002 | Ishibe ........................... 359/212 |
| 2007/0119935 A1* | 5/2007 | Shimomura .................. 235/454 |
| 2008/0002246 A1* | 1/2008 | Ku ................................ 359/204 |
| 2008/0266618 A1* | 10/2008 | Okamura ..................... 358/475 |

* cited by examiner

*Primary Examiner* — Frank Font
(74) *Attorney, Agent, or Firm* — Stanzione & Kim, LLP

(57) ABSTRACT

Provided are a light scanning unit and an image forming apparatus including the light scanning unit. The light scanning unit can include a source, a deflector, and an optical imaging system. The deflector can deflect the light generated by the source. The optical imaging system can form the deflected light into an image on a photosensitive medium and can have a first and second optical imaging lenses collectively configured: to have the functionality of an f-theta lens. The optical imaging system can be such that a first ratio (k/fm) is between about 0.81 and about 0.88, and a second ratio (fm/fm1) is between about 0.6 and about 0.91, where k is an f-theta scanning coefficient of the optical imaging system, fm is a main scanning focal distance of the optical imaging system, and fm1 is a main scanning focal distance of the first optical imaging lens.

23 Claims, 5 Drawing Sheets

LIGHT SCANNING UNIT AND IMAGE FORMING APPARATUS

CROSS-REFERENCE TO RELATED PATENT APPLICATION

This application claims the benefit of Korean Patent Application No. 10-2008-0090687, filed on Sep. 16, 2008 in the Korean Intellectual Property Office, the disclosure of which is incorporated herein by reference in its entirety.

TECHNICAL FIELD

The present disclosure generally relates to a light scanning unit and an image forming apparatus, and, more particularly, to a light scanning unit with improved refractive power distribution and improved arrangement of optical imaging lenses, and an image forming apparatus including the light scanning unit.

BACKGROUND OF RELATED ART

A light scanning unit is an apparatus that can scan laser beams on a photosensitive medium to form electrostatic latent images in an image forming apparatus such as a laser printer, for example.

In order to realize a compact size of a light scanning unit, various refractive power distribution and/or the arrangement of an optical imaging system that attempts to reduce the total length of the optical imaging system have been suggested. However, unfortunately, when the total length of the imaging system is reduced, the maximum main ray angle may increase and/or the depth of the image height may be shortened. Because uniform beam diameter and sufficient depth of the image height is important in a high resolution optical system, for higher resolution systems, the maximum main ray angle may need to be further reduced. In tandem light scanning units, when the pitch between the photosensitive drums is small, the distance between an optical imaging system and a scanning surface may be required to be large in order to provide sufficient toner storage capacity. Bowing of the scanning line or deterioration of the beam diameter can also result due to arrangement errors of the optical imaging system in the sub-scanning direction.

SUMMARY OF THE DISCLOSURE

According to an aspect of the present disclosure, there is provided a light scaring unit that can include a source configured to generate light, a deflector configured to deflect the light generated by the source, and an optical imaging system configured to form the light deflected by the deflector into an image on a photosensitive medium. The optical imaging system can include a first optical imaging lens and a second optical imaging lens, the first optical imaging lens and the second optical imaging lens collectively configured to have the functionality of an f-theta lens. The optical imaging system can be configured such that a first ratio (k/fm) associated with the optical imaging system can be higher than about 0.81 and lower than about 0.88, and a second ratio (fm/fm1) associated with the optical imaging system can be higher than about 0.6 and lower than about 0.91, the first ratio (k/fm) is a ratio of an f-theta scanning coefficient (k) of the optical imaging system to a main scanning focal distance, (fm) of the optical imaging system, the second ratio (fm/fm1) is a ratio of the main scanning focal distance (fm) of the optical imaging system to a main scanning focal distance (fm1) of the first optical imaging lens.

A power of the first optical imaging lens associated with a sub-scanning direction can be substantially zero.

A power of the second optical imaging lens associated with the sub-scanning direction can have a positive value.

The second optical imaging lens can be configured such that a third ratio (R3s/R4s) can be more than about 1.5 and less than about 3, the third ratio (R3s/R4s) being a ratio of a sub-scanning curvature radius (R3s) of an incident surface of the second optical imaging lens on the optical axis of the optical imaging system to a sub-scanning curvature radius (R4s) of an exit surface of the second optical imaging lens on the optical axis of the optical imaging system.

An optical axis of the first optical imaging lens can be configured to correspond to an optical axis of the deflector and an optical axis of the second optical imaging lens can be offset from the optical axis of the deflector in a sub-scanning direction.

The optical imaging system can be configured to produce a deviation of a main scanning beam diameter of about 10% or less.

The optical imaging system can be configured to produce a deviation of a sub-scanning beam diameter of about 10% or less.

The light scanning unit can further include a collimating lens disposed in an optical path between the source and the deflector, wherein the collimating lens can be configured to produce a parallel light from the light generated by the source.

The light scanning unit can further include a cylindrical lens disposed in an optical path between the source and the deflector, wherein the cylindrical lens can be configured to focus the light generated by the source to the deflector in a sub-scanning direction.

The light scanning unit can further include an aperture stop disposed in an optical path between the light source and the deflector, wherein the aperture stop can be configured to adjust a beam diameter of the light generated by the source.

According to another aspect of the present disclosure, there is provided an image forming apparatus that can include a light scanning unit as described above, a photosensitive medium on which a latent image can be formed by the light generated by the light scanning unit, a developer configured to develop the latent image on the photosensitive medium, and a transfer unit configured to receive the image developed by the developer.

According to yet another aspect of the present disclosure there is provided a light scanning unit for an image forming apparatus, the light scanning unit can include a source configured to generate a beam of light, a deflector configured to deflect the beam of light generated by the source, the source and the deflector defining a first optical path having a first optical axis, and an optical system configured to have the functionality of an f-theta lens. The optical system and the deflector defining a second optical path having a second optical axis substantially perpendicular to the first optical axis of the first optical path. The optical system having a first member and a second member, an optical axis of the second member of the optical system being offset from the optical axis associated with the second optical path.

BRIEF DESCRIPTION OF THE DRAWINGS

Various features and advantages of the present disclosure will become more apparent by the following descriptions of several embodiments thereof with reference to the attached drawings, in which.

DETAILED DESCRIPTION OF SEVERAL EMBODIMENTS

Figure 1:
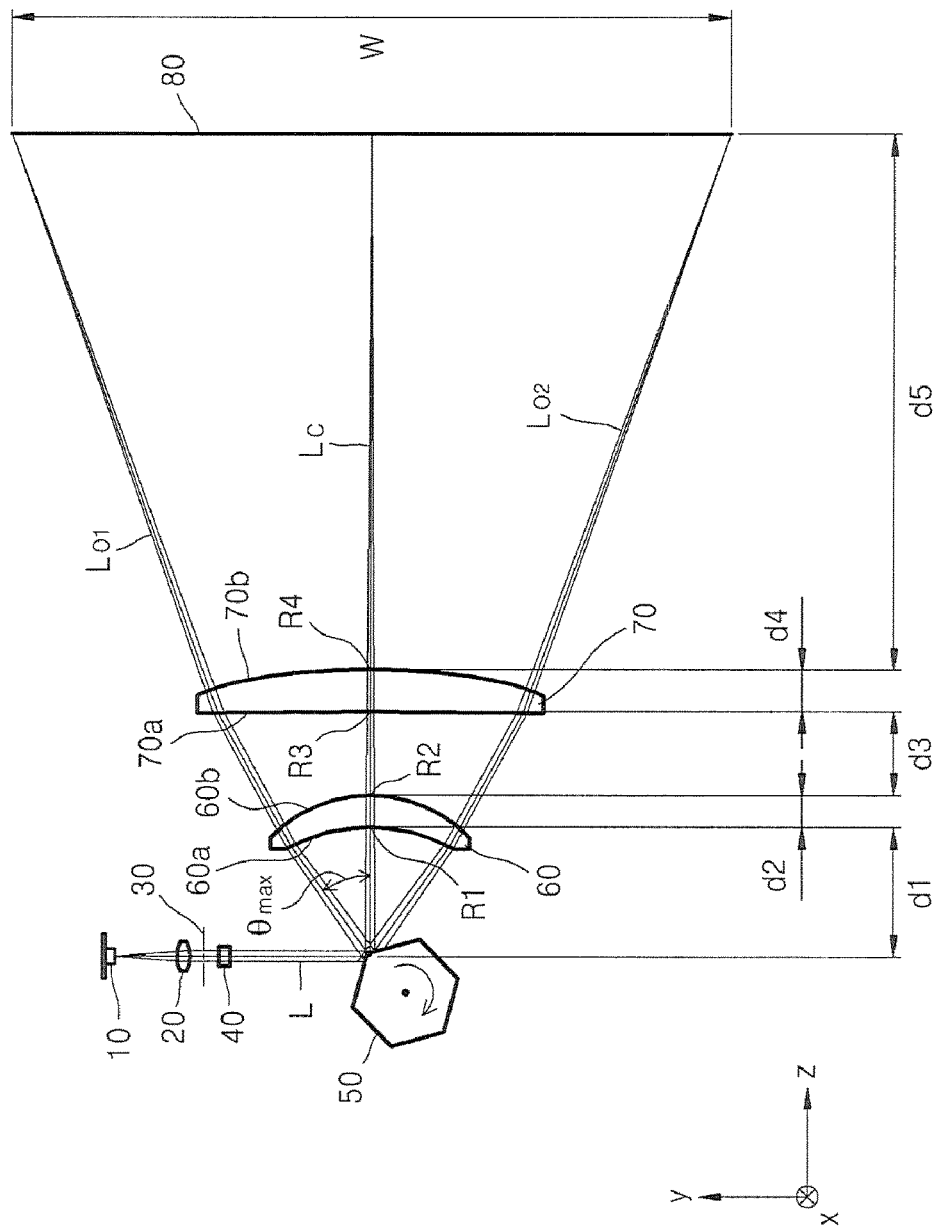
FIG. 1 illustrates the optical arrangement of a light scanning unit in the main scanning direction according to an embodiment of the disclosure.

Reference will now be made in detail to several embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should also be noted that in the drawings, the dimensions of the features are not intended to be to true scale and may be exaggerated for the sake of allowing greater understanding. Repetitive description with respect to like elements of different embodiments may be omitted for the sake of brevity.

Figure 2:
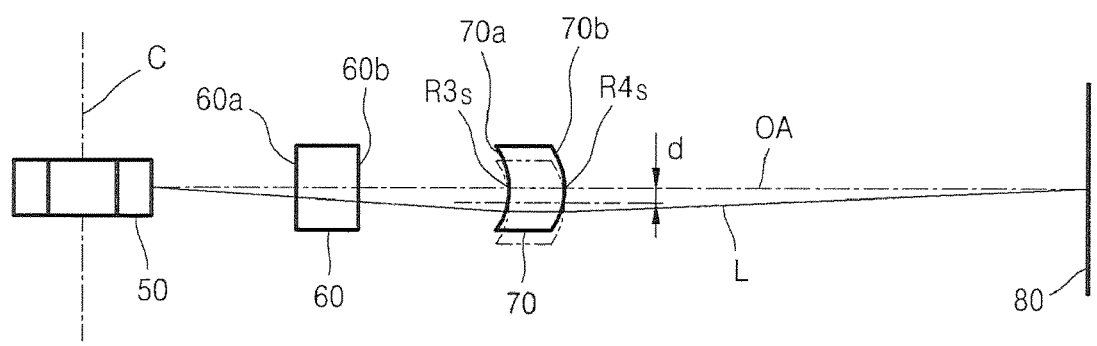
FIG. 2 illustrates the optical arrangement of the light scanning unit of FIG. 1 in the sub-scanning direction.

FIG. 1 illustrates the optical arrangement of a light scanning unit in a main scanning direction according to an embodiment of the disclosure. In FIG. 1, the direction along the x-axis represents the sub-scanning direction from the perspective of a scanning surface 80 while the direction along the y-axis represents the main scanning direction. FIG. 2 illustrates the optical arrangement of the light scanning unit of FIG. 1 in the sub-scanning direction, from the perspective of an x-z plane that includes the rotational axis C of the deflector 50 of FIG. 1.

Referring to FIGS. 1 and 2, the light scanning unit can include a light source 10, a deflector 50 configured to deflect light L received from the light source 10 and an optical imaging system that may include an optical imaging lens 60 and an optical imaging lens 70 configured to image the light deflected by the deflector 50 on the scanning surface 80.

The light source 10 can beta semiconductor laser diode, for example.

A collimating lens 20 can be disposed along an optical path defined between the light source 10 and the deflector 50. The collimating lens 20 can be a focusing lens, and can be configured to form parallel light from the light emitted by the light source 10. A cylindrical lens 40 can be disposed on the optical path between the collimating lens 20 and the deflector 50. The cylindrical lens 40 can be, for example, an anamorphic lens having a predetermined power in the sub-scanning direction, and can be configured to focus light that has passed through the collimating lens 20 in the sub-scanning direction to a deflection surface of the deflector 50. Moreover, an aperture stop 30 can be disposed between the collimating lens 20 and the cylindrical lens 40 to define the diameter of beam passing therethrough. The collimating lens 20, the aperture stop 30, and the cylindrical lens 40 can form a pre-scan optical imaging system of the light scanning unit.

The deflector 50 can be, for example, a polygonal mirror having multiple deflection surfaces, and can be rotated at a predetermined speed by a driving unit (not shown) such as a spindle motor, for example. As the deflector 50 is rotated, light L emitted from the light source 10 can be scanned along the scanning surface 80 in the main scanning direction.

The optical imaging system can be a optical scanning unit having the characteristics or behavior of a convergence lens and of an f-theta (f-θ) lens, and can be configured to allow the light beams, which are reflected and deflected by the deflector 50 and are based on image information, to be formed on the scanning surface 80. The optical imaging system can include the first optical imaging lens 60 and the second optical imaging lens 70. The first and second optical imaging lenses 60 and 70 can be toric lenses, that is, each can have two tonic surfaces. The first optical imaging lens 60 can have positive power in the main-scanning direction and zero power in the sub-scanning direction. That is, as illustrated in FIG. 2, a first surface 60a of the first optical imaging lens 60 and a second surface 60b of the first optical imaging lens 60 are planar along a sub-scanning section of the first optical imaging lens 60. Moreover, the second optical imaging lens 70 can have positive power in the sub-scanning direction.

Referring to FIG. 2, the light L deflected by the deflector 50 can be scanned slightly off axis from the intended optical axis (OA) of the deflector 50. As illustrated in FIG. 2, the second optical imaging lens 70 can be "off axis" by a distance d in the sub-scanning direction, and thus the light L deflected in the deflector 50 can be formed as an image on a center position of the scanning surface 80. That is, the second optical imaging lens 70 can be configured to correct off axis deflection of the light L so that the deflection surface of the deflector 50 and the scanning surface 80 in the sub-scanning section, which is to be optically scanned, conformed to each other. Because the first optical imaging lens 60 does not have power in the sub-scanning direction, the path of the light L deflected by the deflector 50 in the sub-scanning section does not change even when the first optical imaging lens 601 is moved "off axis" in the sub-scanning direction. Thus, the first and second optical imaging lenses 60 and 70 can be configured in such a manner that the correction of the off axis deflection of the light L deflected by the deflector 50 in the sub-scanning section is provided by the second optical imaging lens 70.

Figure 3:
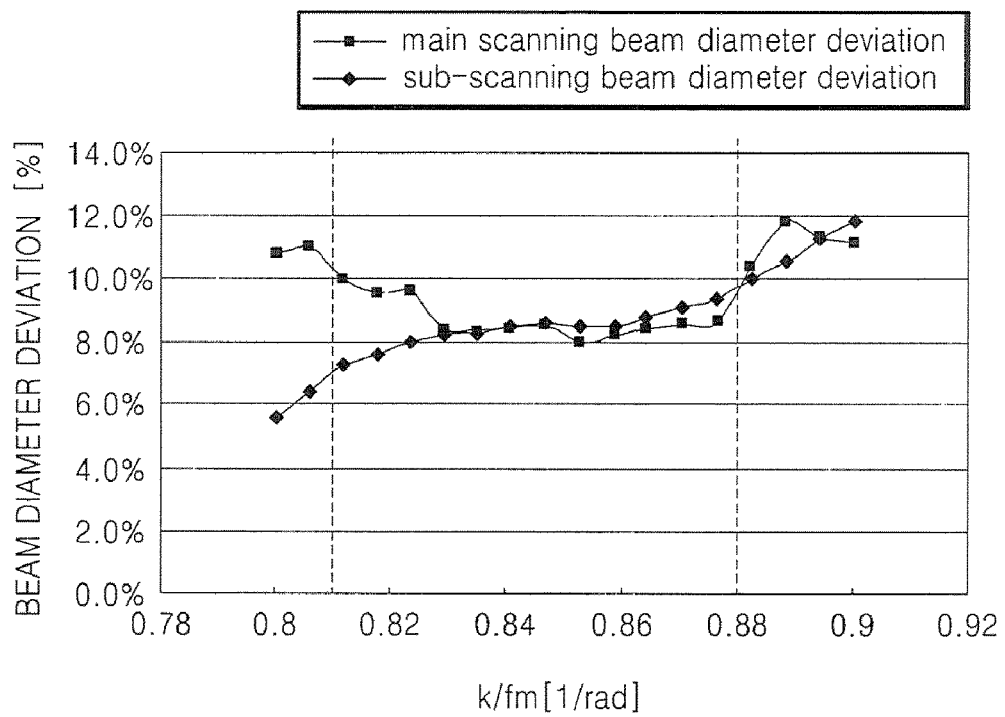
FIG. 3 shows illustrative examples of the deviations in main scanning and sub-scanning beam diameter of an optical imaging system as a function of a ratio k/fm1 of the optical imaging system when a second optical imaging lens is moved by 0.5 mm off axis in the sub-scanning direction.

FIG. 3 shows deviations in beam diameter along the main scanning direction and the sub-scanning direction of the optical imaging system with respect to the ratio k/fm of the optical imaging system when the second optical imaging lens 70 of FIG. 1 is offset by 0.5 mm from the axis in the sub-scanning direction. In FIG. 3, k refers to an f-θ scanning coefficient of the optical imaging system while fm refers to the main scanning focal distance of the optical imaging system. The reference beam diameter level can be about 13.5%. The f-θ scanning coefficient k of the optical imaging system can also referred to as a scanning constant or a scanning coefficient, for example.

By positioning the second optical imaging lens 70 off axis in the sub-scanning direction, an optimum arrangement of the main scanning/sub-scanning beam diameter of the optical imaging system can be obtained. Referring to FIG. 3, when the optical imaging system satisfies Equation 1 below, the deviation of the main scanning beam diameter and the sub-scanning beam diameter can be limited to within about 10%, for example.

$$0.81 < k/fm < 0.88 \quad \text{(Equation 1)}$$

In a high resolution scanning optical system, a regular beam diameter and/or a sufficient depth of field can be important. Because the total power of the optical imaging systems with respect to the f-θ scanning coefficient k can be set according to Equation 1, a sufficiently deep focal depth on the scanning surface 80 can be obtained instead of having to reduce the maximum scanning angle, $\theta_{max}$. Thus, the requirements of a high resolution scanning optical system can be met when the conditions in Equation 1 are met.

Figure 4:
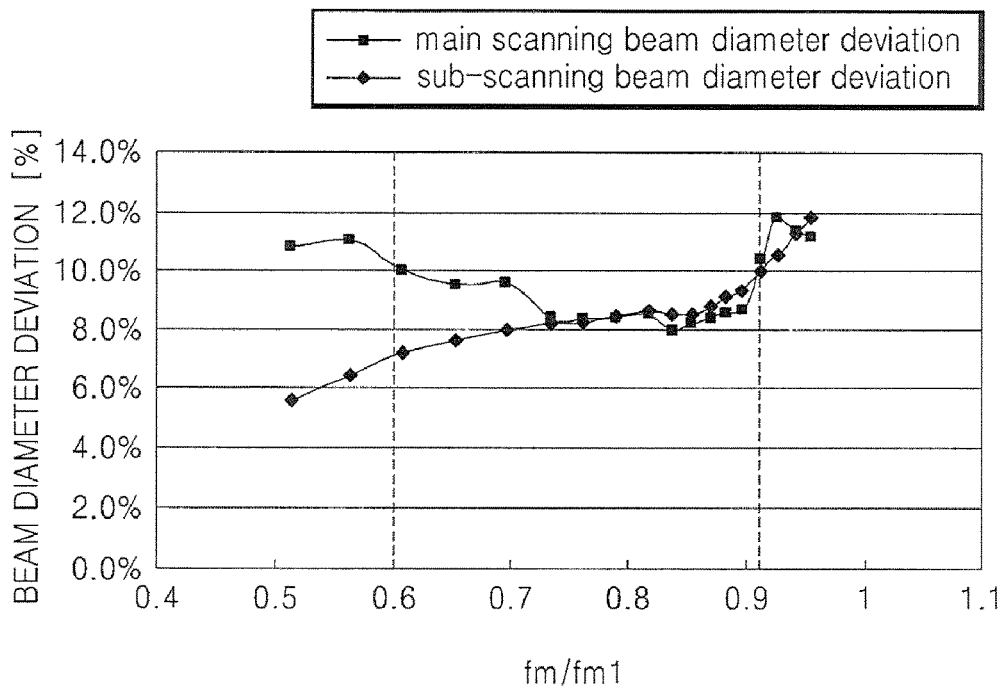
FIG. 4 shows illustrative examples of the deviations in main scanning and sub-scanning beam diameter of the optical imaging system as a function of a ratio fm/fm1 of the optical imaging system when the second optical imaging lens is moved by 0.5 mm off axis in the sub-scanning direction.

FIG. 4 shows deviations in beam diameter along the main scanning direction and the sub-scanning direction of the optical imaging system caused when the second optical imaging lens 70 of FIG. 1 is offset by 0.5 mm from the axis in the sub-scanning direction, with respect to a ratio fm/fm1. In FIG. 4, fm refers to the total focal distance of the optical imaging system while fm1 refers to the main scanning focal distance of the first optical imaging system 60 of FIG. 1. The reference beam diameter level can be about 13.5%.

As described above, when the second optical imaging lens 70 is offset in the sub-scanning direction, the main scanning/sub-scanning beam diameter can deteriorate. As shown in FIG. 4, however, when the first and second optical imaging lenses 60 and 70 of the optical imaging systems satisfy Equation 2 below, the deviations in the main scanning beam diameter and the sub-scanning beam diameter can be limited to within about 10%, for example.

$$0.6 < fm/fm1 < 0.91 \quad \text{(Equation 2)}$$

Moreover, when the pitch between photosensitive drums is small in a tandem light scanning, unit, the distance between the second optical imaging lens 70 and the scanning surface 80 may need to be large in order to provide sufficient toner storage capacity. By distributing the main scanning power of the first and second optical imaging lenses 60 and 70 according to Equation 2, the typical requirements of a tandem light scanning unit can be met.

As described above, to reduce scanning line bowing that results from arrangement errors of the first and second optical imaging lenses 60 and 70 in the sub-scanning direction, sub-scanning power Φs1 of the first optical imaging lens 60 can be set to be substantially zero power, and sub-scanning power Φs2 of the second optical imaging lens 70 can be set to be a positive power. Moreover, the optical arrangement of the second optical imaging lens 70 may need to be optimized so that the sub-scanning magnification deviation is minimized. When the second optical imaging lens 70 is moved in the sub-scanning direction, as illustrated in FIG. 2, and the ratio of the sub-scanning curvature radius R3s of the incident surface 70a of the second optical imaging lens 70 to the sub-scanning curvature radius R4s of an exit surface 70b of the second optical imaging lens 70 on the optical axis is large, deviations in the main scanning/sub-scanning beam diameter can increase and injection molding of the second optical imaging lens 70 becomes difficult. On the other hand, when the ratio R3s/R4s is too low, the spherical aberration in the sub-scanning direction can increase, and thus the deviation in the sub-scanning beam diameter can also increase. To address these issues, the second optical imaging lens 70 can be designed to satisfy Equation 3 below.

$$1.5 < R3s/R4s < 3 \quad \text{(Equation 3)}$$

By configuring the lens surfaces of the second optical imaging lens 70 according to Equation 3, the deviation of sub-scanning magnification and the deviations in the main scanning beam diameter and the sub-scanning beam diameter when the second optical imaging lens 70 is moved off axis in the sub-scanning direction can be minimized.

The aspheric shape of an incident surface 60a of the first optical imaging lens 60 and of an exit surface 60b of the first optical imaging lens 60 and the aspheric shape of the incident surface 70a and the exit surface 70b of the second optical imaging lens 70 can be expressed according to Equation 4 below.

$$z = \frac{C_1 |y|^2}{1 + \sqrt{1 - (1+K)C_1^2 |y|^2}} + \sum_n a_n |y|^n + \frac{C_2 \left(1 + \sum_n b_n |y|^n\right) x^2}{1 + \sqrt{1 - C_2^2 \left(1 + \sum_n b_n |y|^n\right)^2 x^2}}, \quad \text{(Equation 4)}$$

where z is the distance from a definite point of the optical lens toward the optical axis OA, x is the distance horizontally along the optical axis OA, y is the distance from the definite point of the optical imaging lens in the main scanning direction, K is the conic constant, $a_n$ is the aspheric coefficient in the main scanning direction, and $b_n$ is the aspheric, coefficient in the sub-scanning direction. Moreover, $C_1$ is the reciprocal number of the curvature radius R in the main scanning direction and $C_2$ is the reciprocal number of the curvature radius r in the sub-scanning direction. Examples of the aspheric surfaces of the first and second optical imaging lenses 60 and 70 in accordance with Equation 4 are listed in Table 2 below.

The information shown in Table 1 below corresponds to detailed design data of the light scanning unit according to an embodiment of the disclosure.

TABLE 1

| Composition of light scanning unit | | |
|---|---|---|
| f-θ scanning coefficient (mm/rad) | | |
| f-θ scanning coefficient | k | 154.7 |
| Effective scanning width | W | 216 |
| wavelength, refractive index | | |
| wavelength used | λ (nm) | 655 |
| refractive index of first optical imaging lens | N1 | 1.53 |
| refractive index of second optical imaging lens | N2 | 1.53 |
| Arrangement of optical imaging system (mm) | | |
| Distance between reflection surface of polygon mirror - first lens incidence surface | d1 | 31 |
| Distance between first lens incidence surface - first lens exit surface | d2 | 8 |
| Distance between first lens exit surface - second lens incidence surface | d3 | 21 |

TABLE 1-continued

Composition of light scanning unit

| | | |
|---|---|---|
| Distance between second lens incidence surface - second lens exit surface | d4 | 10 |
| Distance between second lens exit surface - scanning surface | d5 | 129.2 |

TABLE 2

| | | | Main scanning shape | | Sub-scanning shape | | | | | Main scanning shape | | Sub-scanning shape | |
|---|---|---|---|---|---|---|---|---|---|---|---|---|---|---|
| First lens incidence surface | Side at the light source | | R<br>a4<br>a6<br>a8<br>a10<br>a3<br>a5<br>a7<br>a9 | −6.194E+01<br>3.416E−06<br>−1.941E−10<br>−4.494E−13<br>2.829E−16<br>−1.125E−05<br>−7.117E−08<br>−1.850E−11<br>5.436E−16 | r<br>b4<br>b6<br>b8<br>b10<br>b3<br>b5<br>b7<br>b9 | 0<br>0<br>0<br>0<br>0<br>0<br>0<br>0<br>0 | First lens incidence surface | Side at the light source | | R<br>a4<br>a6<br>a8<br>a10<br>a3<br>a5<br>a7<br>a9 | 1.578E+03<br>3.776E−07<br>−2.030E−11<br>2.753E−14<br>5.090E−18<br>5.226E−06<br>−1.631E−08<br>2.805E−12<br>−8.417E−16 | r<br>B4<br>B6<br>B8<br>B10<br>B3<br>B5<br>B7<br>B9 | −3.212E+01<br>2.730E−07<br>−7.756E−10<br>4.939E−13<br>1.453E−16<br>−9.505E−06<br>2.222E−09<br>1.602E−11<br>−1.809E−14 |
| | Side opposite to the light source | | R<br>a4<br>a6<br>a8<br>a10<br>a3<br>a5<br>a7<br>a9 | −6.194E+01<br>1.438E−06<br>1.872E−09<br>1.302E−12<br>−2.796E−16<br>6.617E−05<br>−1.717E−07<br>3.043E−11<br>−4.572E−14 | r<br>b4<br>b6<br>b8<br>b10<br>b3<br>b5<br>b7<br>b9 | 0<br>0<br>0<br>0<br>0<br>0<br>0<br>0<br>0 | | Side opposite to the light source | | R<br>a4<br>a6<br>a8<br>a10<br>a3<br>a5<br>a7<br>a9 | 1.578E+03<br>1.183E−06<br>−1.061E−10<br>−4.677E−15<br>9.433E−18<br>−4.206E−05<br>−6.476E−09<br>5.480E−13<br>−5.083E−16 | r<br>B4<br>B6<br>B8<br>B10<br>B3<br>B5<br>B7<br>B9 | −3.212E+01<br>6.834E−07<br>−7.510E−10<br>4.552E−13<br>1.753E−16<br>−2.293E−05<br>4.407E−09<br>1.333E−11<br>−1.871E−14 |
| First lens exit surface | Side at the light source | | R<br>a4<br>a6<br>a8<br>a10<br>a3<br>a5<br>a7<br>a9 | −4.207E+01<br>4.636E−06<br>−9.973E−10<br>6.312E−13<br>8.068E−16<br>−1.307E−05<br>−3.964E−08<br>9.333E−12<br>−5.154E−14 | r<br>b4<br>b6<br>b8<br>b10<br>b3<br>b5<br>b7<br>b9 | 0<br>0<br>0<br>0<br>0<br>0<br>0<br>0<br>0 | Second lens exit surface | Side at the light source | | R<br>a4<br>a6<br>a8<br>a10<br>a3<br>a5<br>a7<br>a9 | −8.322E+02<br>−1.443E−06<br>6.002E−11<br>−2.376E−14<br>8.052E−19<br>1.082E−05<br>1.486E−08<br>−1.923E−12<br>4.430E−16 | r<br>B4<br>B6<br>B8<br>B10<br>B3<br>B5<br>B7<br>B9 | −1.499E+01<br>1.499E−06<br>9.388E−10<br>−3.390E−13<br>−1.162E−17<br>−1.708E−05<br>−5.970E−08<br>5.182E−12<br>3.602E−15 |
| | Side opposite to the light source | | R<br>a4<br>a6<br>a8<br>a10<br>a3<br>a5<br>a7<br>a9 | −4.207E+01<br>3.759E−06<br>−1.146E−09<br>2.298E−12<br>4.960E−16<br>3.685E−05<br>−7.315E−08<br>9.662E−12<br>−5.836E−14 | r<br>b4<br>b6<br>b8<br>b10<br>b3<br>b5<br>b7<br>b9 | 0<br>0<br>0<br>0<br>0<br>0<br>0<br>0<br>0 | | Side opposite to the light source | | R<br>a4<br>a6<br>a8<br>a10<br>a3<br>a5<br>a7<br>a9 | −8.322E+02<br>−6.097E−07<br>1.748E−10<br>−5.359E−14<br>9.060E−18<br>−3.010E−05<br>1.027E−08<br>−2.083E−12<br>−1.218E−16 | r<br>B4<br>B6<br>B8<br>B10<br>B3<br>B5<br>B7<br>B9 | −1.499E+01<br>2.500E−06<br>1.425E−09<br>−5.108E−13<br>2.635E−17<br>−2.776E−05<br>−9.804E−08<br>1.265E−11<br>1.884E−15 |

In Table 2, the aspheric coefficient of a side of an optical imaging lens near the light source and that of a side of the optical imaging lens away from the light source, that is, on a side opposite to the light source, are shown. Referring to FIG. 1, among light beams, a light beam section $L_{O1}$-Lc scanned to the scanning surface 80 near the light source 10 corresponds to the side at the light source, and a light beam section Lc-$L_{O2}$ away from the light source 10 corresponds to the side opposite to the light source.

According to the design data of Tables 1 and 2, the f-θ scanning coefficient k can be about 54.7 millimeters/radian (mm/rad), the main scanning focal distance of the optical imaging system fm can be about 181.4 mm, and the main scanning focal distance of the first optical imaging system fm1 can be about 217.0 mm. With such values for k, fm, and fm1, k/fm is 0.853, which satisfies the requirements of Equation 1, and fm/fm1 is 0.836, which satisfies the requirements of Equation 2. Moreover, the curvature radius R3s of the sub-scanning incident surface 70a of the second optical imaging lens 70 along the optical axis can be about −32.12 mm, and the curvature radius R4s of the sub-scanning exit surface 70b of the second optical imaging lens 70 along the optical axis can be −15.00 mm. With such values for R3s and R4s, the ratio R3s/R4s is 2.14, which satisfies the requirements of Equation 3.

Figure 5:
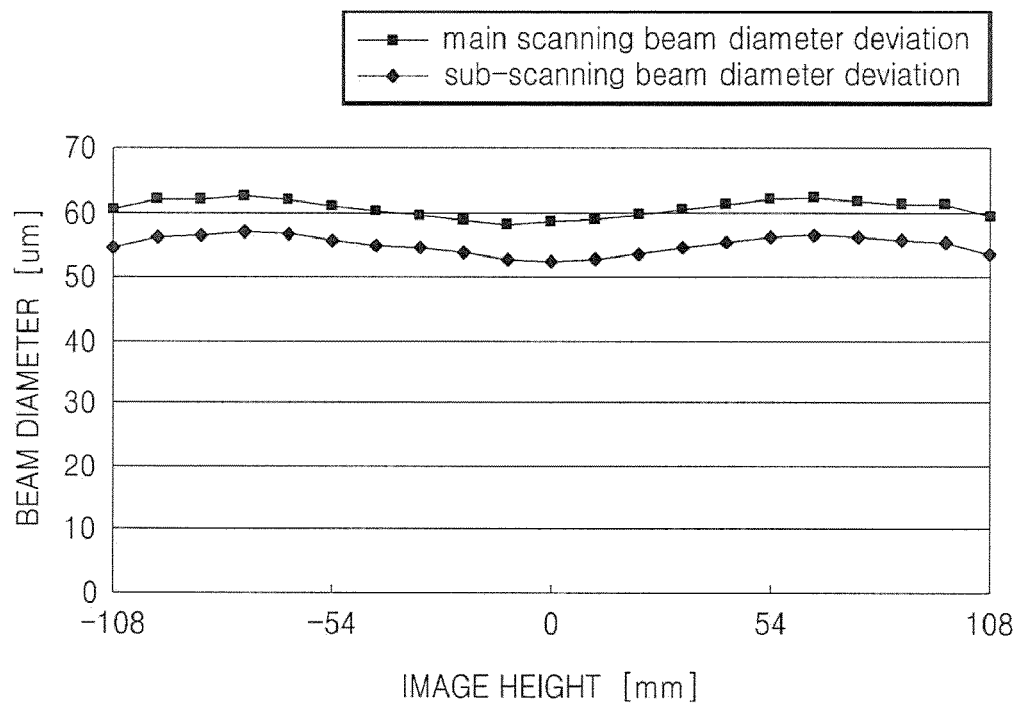
FIG. 5 shows illustrative examples of main scanning and sub-scanning beam diameter of the optical imaging system according to the image height when the second optical imaging lens is moved by 0.5 mm off axis in the sub-scanning direction.

FIG. 5 shows the beam diameter along the main scanning directions and along the sub-scanning direction of the optical imaging system according to the image height when the second optical imaging lens 70 of FIG. 1 is offset or moved by 0.5 mm from the axis in the sub-scanning direction according to embodiments associated with the design data of Tables 1 and 2. Referring to FIG. 5, even when the second optical imaging lens 70 is offset or moved off axis in the sub-scanning direction, the deviation in the main/sub-scanning beam diameter is appropriately within 10%, for example.

Figure 6:
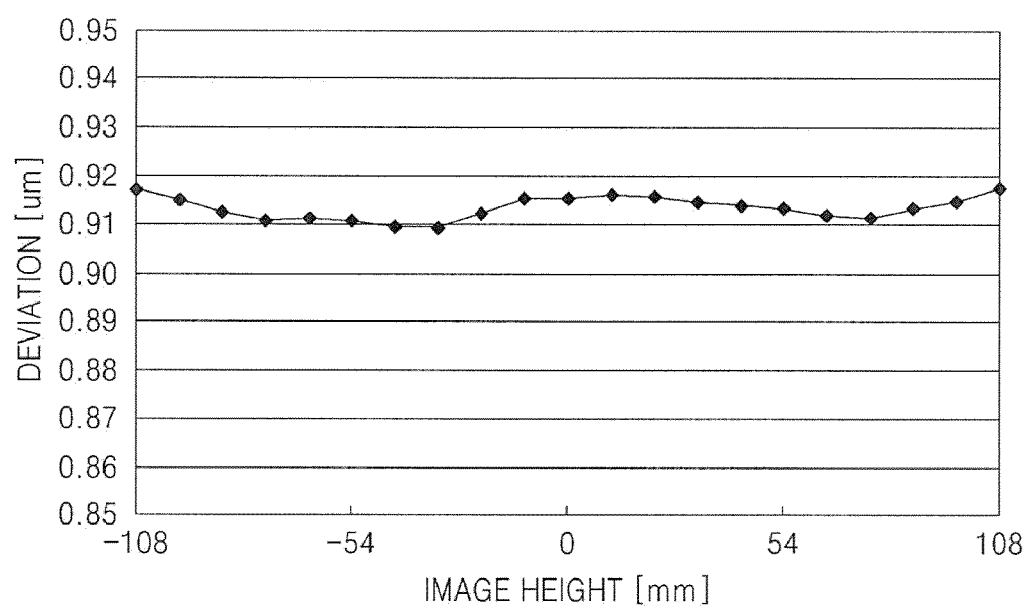
FIG. 6 shows illustrative examples of the scanning line bowing characteristics of the optical imaging system according to the image height when the second optical imaging lens is moved by 0.5 mm off axis in the sub-scanning direction.

FIG. 6 shows scanning line bow of the optical imaging system based on image height when the second optical imaging lens 70 of FIG. 1 is offset or moved by 0.5 mm from the axis in the sub-scanning direction according to embodiments associated with the design data of Tables 1 and 2. Referring to FIG. 6, even when the second optical imaging lens 70 is offset or moved off axis in the sub-scanning direction, the deviation in the scanning line bowing is appropriately 10 micrometers (μm), for example. As a result, it is possible to realize a large scale manufacturing when assembling the first and second optical imaging lenses 60 and 70.

Figure 7:
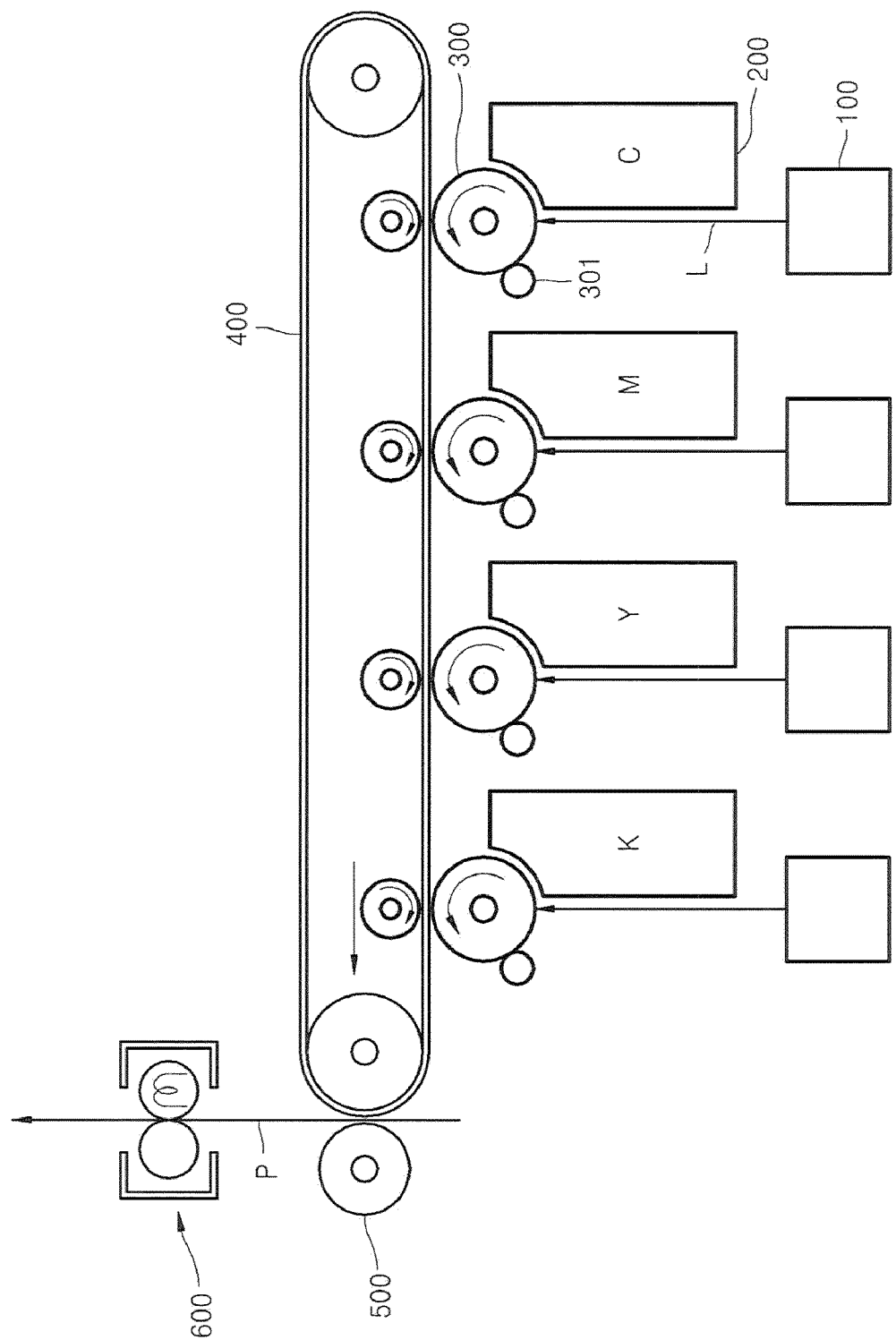
FIG. 7 is a schematic view of an image forming apparatus according to an embodiment of the disclosure.

An image forming apparatus having a light scanning unit 100 according to an embodiment of the disclosure that can be used to produce color images is described below with reference to FIG. 7. FIG. 7 is a schematic view illustrating an image forming apparatus including the light source unit 100.

Referring, to FIG. 7, the image forming apparatus can include the light scanning unit(s) 100, developing units 200, photosensitive drums 300, charging rollers 301, an intermediate transfer belt 400, a transfer roller 500 and a fixing unit 600.

The light scanning unit 100 can be configured to scan linear light L, which is modulated according to image information, to the photosensitive drums 300. The light scanning unit 100 can correspond to the light scanning unit described above. The photosensitive drum 300 is an example of a photoreceptor and can include a photosensitive layer of a predetermined thickness on an outer circumferential surface of a cylinder metal pipe. The outer circumferential surface of the photosensitive drum 300 can be a surface on which the light L scanned from the light scanning unit 100 forms an image. Alternatively, a belt-type photosensitive belt can be used as a photoreceptor. The charging roller 301 can be configured to rotate while in contact with the photosensitive drums 300, and can be configured to charge the surface of the photosensitive drums 300 to a uniform electrical potential. To that end, a charging bias voltage Vc can be applied to the charging roller 301. In some embodiments, a corona charger (not shown) can be used instead of the charging roller 301. Toner can be contained or stored in the developing unit 200. The toner can be transported to the photosensitive drum 300 in response to a developing bias voltage applied between the developing unit 200 and the photosensitive drum 300, and can be used to develop an electrostatic latent image into a visible toner image. The toner image formed on the photosensitive drum 300 can be transferred to the intermediate transfer belt 400. The toner image can be transferred to a paper P, for example, transported between the transfer roller 500 and the intermediate transfer belt 400, by a transfer bias voltage applied to the transfer roller 500. In some embodiments the toner image may be transferred directly to the paper P from the photosensitive drum 300 without first being transferred to the intermediate transfer belt 400. The toner image transferred to the paper P can be fixed to the paper P by heat and pressure from the fixing unit 600, thereby completing formation of an image.

To print a color image, a light scanning unit 100, a developing unit 200 and a photosensitive drum 300 corresponding to each color of toner to be used in forming the image can be provided. The light scanning unit 100 can be configured to scan four light beams, one light beam to each of the four photosensitive drums 300. In the four photosensitive drums 300, electrostatic latent images corresponding to image information of black (K), magenta (M), yellow (Y), and cyan (C) colors are formed. The four developing units 200 can be configured to supply black (K), magenta (M), yellow (Y), and cyan (C) color toner to the photosensitive drums 300 to form black (K), magenta (M), yellow (Y), and cyan (C) toner images, respectively. The black (K), magenta (M), yellow (Y), and cyan (C) toner images can be transferred to the intermediate transfer belt 400 where the images can be overlapped, and can then be transferred to the paper P.

While the disclosure has been particularly shown and described with reference to several embodiments thereof with particular details, it will be apparent to one of ordinary skill in the art that various changes may be made to these embodiments without departing from the principles and spirit of the disclosure, the scope of which is defined in the following claims and their equivalents.

What is claimed is:

1. A light scanning unit, comprising: a source configured to generate light; a deflector configured to deflect the light generated by the source; and an optical imaging system configured to form the light deflected by the deflector into an image on a photosensitive medium, the optical imaging system including a first optical imaging lens and a second optical imaging lens, the first optical imaging lens and the second optical imaging lens collectively configured to have the functionality of an f-theta lens, wherein the optical imaging system is configured such that a first ratio of an f-theta scanning coefficient of the optical imaging system to a main scanning focal distance of the optical imaging system is higher than about 0.81 and lower than about 0.88, and a second ratio of the main scanning focal distance of the optical imaging system to a main scanning focal distance of the first optical imaging lens is higher than about 0.6 and lower than about 0.91.

2. The light scanning unit of claim 1, wherein a power of the first optical imaging lens associated with a sub-scanning direction is substantially zero.

3. The light scanning unit of claim 2, wherein a power of the second optical imaging lens associated with the sub-scanning direction has a positive value.

4. The light scanning unit of claim 1, wherein the second optical imaging lens is configured such that a third ratio is more than about 1.5 and less than about 3, the third ratio being a ratio of a sub-scanning curvature radius of an incident surface of the second optical imaging lens on the optical axis of the optical imaging system to a sub-scanning curvature radius of an exit surface of the second optical imaging lens on the optical axis of the optical imaging system.

5. The light scanning unit of claim 1, wherein: an optical axis of the first optical imaging lens is configured to correspond to an optical axis of the deflector, and an optical axis of the second optical imaging lens is offset from the optical axis of the deflector in a sub-scanning direction.

6. The light scanning unit of claim 1, wherein the optical imaging system is configured to produce a deviation of a main scanning beam diameter of about 10% or less.

7. The light scanning unit of claim 1, wherein the optical imaging system is configured to produce a deviation of a sub-scanning beam diameter of about 10% or less.

8. The light scanning unit of claim 1, further comprising: a collimating lens disposed in an optical path between the source and the deflector, wherein the collimating lens is configured to produce a parallel light from the light generated by the source.

9. The light scanning unit of claim 1, further comprising: a cylindrical lens disposed in an optical path between the source and the deflector, wherein the cylindrical lens is configured to focus the light generated by the source to the deflector in a sub-scanning direction.

10. The light scanning unit of claim 1, further comprising: an aperture stop disposed in an optical path between the light source and the deflector, wherein the aperture stop is configured to adjust a beam diameter of the light generated by the source.

11. An image forming apparatus comprising: a light scanning unit configured to generate a light, the light scanning unit including a source, a deflector, and an optical imaging system; a photosensitive medium on which a latent image is formed by the light generated by the light scanning unit; a developer configured to develop the latent image on the photosensitive medium; and a transfer unit configured to receive the image developed by the developer, wherein the source of the light scanning unit is configured to generate the light, wherein the deflector of the light scanning unit is configured to deflect the light generated by the source, wherein the optical imaging system of the light scanning unit is configured to form the light deflected by the deflector into an image on the photosensitive medium, the optical imaging system including a first optical imaging lens and a second optical imaging lens, the first optical imaging lens and the second optical imaging lens collectively configured to have the functionality of an f-theta lens, and wherein the optical imaging system is configured such that a first ratio of an f-theta scanning coefficient of the optical imaging system to a main scanning focal distance of the optical imaging system is higher than about 0.81 and lower than about 0.88, and a second ratio of the main scanning focal distance of the optical imaging system to a main scanning focal distance of the first optical imaging lens is higher than about 0.6 and lower than about 0.91.

12. The image forming apparatus of claim 11, wherein a power of the first optical imaging lens associated with a sub-scanning direction is substantially zero.

13. The image forming apparatus of claim 12, wherein a power of the second optical imaging lens associated with the sub-scanning direction has a positive value.

14. The image forming apparatus of claim 11, wherein the second optical imaging lens is configured such that a third ratio is more than about 1.5 and less than about 3, the third ratio being a ratio of a sub-scanning curvature radius of an incident surface of the second optical imaging lens on the optical axis of the optical imaging system to a sub-scanning curvature radius of an exit surface of the second optical imaging lens on the optical axis of the optical imaging system.

15. The image forming apparatus of claim 11, wherein: an optical axis of the first optical imaging lens is configured to correspond to an optical axis of the deflector, and an optical axis of the second optical imaging lens is offset from the optical axis of the deflector in a sub-scanning direction.

16. The image forming apparatus of claim 11, wherein the optical imaging system is configured to produce a deviation of a main scanning beam diameter of about 10% or less.

17. The image forming apparatus of claim 11, wherein the optical imaging system is configured to produce a deviation of a sub-scanning beam diameter of about 10% or less.

18. The image forming apparatus of claim 11, further comprising: a collimating lens disposed in an optical path between the source and the deflector, wherein the collimating lens is configured to produce a parallel light from the light generated by the source.

19. The image forming apparatus of claim 11, further comprising: a cylindrical lens disposed in an optical path between the source and the deflector, wherein the cylindrical lens is configured to focus the light generated by the source to the deflector in a sub-scanning direction.

20. The image forming apparatus of claim 11, further comprising: an aperture stop disposed in an optical path between the light source and the deflector, wherein the aperture stop is configured to adjust a beam diameter of the light generated by the source.

21. A light scanning unit for an image forming apparatus, comprising: a source configured to generate a beam of light; a deflector configured to deflect the beam of light generated by the source, the source and the deflector defining a first optical path having a first optical axis; and an optical system configured to have the functionality of an f-theta lens, the optical system and the deflector defining a second optical path having a second optical axis substantially perpendicular to the first optical axis of the first optical path, the optical system having a first member and a second member, an optical axis of the second member of the optical system being offset from the optical axis associated with the second optical path, wherein the optical system is configured such that a first ratio of an f-theta scanning coefficient of the optical system to a main scanning focal distance of the optical system is higher than about 0.81 and lower than about 0.88, and a second ratio of the main scanning focal distance of the optical system to a main scanning focal distance of the first member of the optical system is higher than about 0.6 and lower than about 0.91.

22. The light scanning unit of claim 21, further comprising: a collimating lens disposed in the first optical path and configured to convert the light beam into a substantially parallel light beam; an aperture disposed in the first optical path and configured to adjust a beam diameter of the light beam; and a cylindrical lens disposed in the first optical path and configured to focus the light beam to the deflector in a sub-scanning direction.

23. A light scanning unit for an image forming apparatus, comprising: a source configured to generate a beam of light; a deflector configured to deflect the beam of light generated by the source, the source and the deflector defining a first optical path having a first optical axis; and an optical system configured to have the functionality of an f-theta lens, the optical system and the deflector defining a second optical path having a second optical axis substantially perpendicular to the first optical axis of the first optical path, the optical system having a first member and a second member, an optical axis of the second member of the optical system being offset from the optical axis associated with the second optical path, wherein the second member of the optical system is configured such that a ratio is more than about 1.5 and less than about 3, the ratio being a ratio of a sub-scanning curvature radius of an incident surface of the second member of the optical system on the optical axis of the optical system to a sub-scanning curvature radius of an exit surface of the second member of the optical system on the optical axis of the optical system.

* * * * *